(12) United States Patent
Jun

(10) Patent No.: US 7,687,131 B2
(45) Date of Patent: Mar. 30, 2010

(54) PROFILE GASKET AND COMPOSITION THEREOF

(76) Inventor: Young Sig Jun, 5-306 Woosung-Apartment, 872-20 Bonoh-Dong, Ansan-si (KR) 425-180

( * ) Notice: Subject to any disclaimer, the term of this patent is extended or adjusted under 35 U.S.C. 154(b) by 1031 days.

(21) Appl. No.: 10/530,842

(22) PCT Filed: Jan. 6, 2003

(86) PCT No.: PCT/KR03/00017

§ 371 (c)(1),
(2), (4) Date: Apr. 3, 2006

(87) PCT Pub. No.: WO2004/033974

PCT Pub. Date: Apr. 22, 2004

(65) Prior Publication Data

US 2006/0188690 A1     Aug. 24, 2006

(30) Foreign Application Priority Data

Oct. 10, 2002  (KR) .................. 20-2002-0030320

(51) Int. Cl.
*B32B 3/06*     (2006.01)

(52) U.S. Cl. .................. 428/99; 525/240; 525/241; 525/242; 525/233

(58) Field of Classification Search .................. 428/99; 525/240, 242, 241, 233
See application file for complete search history.

(56) References Cited

U.S. PATENT DOCUMENTS 6,231,799 B1 *  5/2001  Kempf et al. ............... 264/319

FOREIGN PATENT DOCUMENTS

| JP | 04-266952 | | 9/1992 |
| JP | 11-236551 | | 8/1999 |
| JP | 11-236551 A | * | 8/1999 |
| JP | 2000-191880 | * | 7/2000 |

* cited by examiner

Primary Examiner—Robert D. Harlan
(74) Attorney, Agent, or Firm—The Webb Law Firm

(57) ABSTRACT

A profile gasket has a locking part below a gasket base for mounting the gasket to a target body such as a refrigerator door. The gasket also has a sealing portion and an elastic support for elastically supporting the sealing portion to the gasket base. The gasket is made of a thermoplastic resin having a preferred composition.

9 Claims, 7 Drawing Sheets

Table 1 : (Test Method: LG(61)-E-8020)

| Test Item | Standard | Result | Note |
|---|---|---|---|
| Hardness | 67~77 | 71 | Shore A |
| Tensile Strength | 0.8Kg/cm² | 0.75~0.85 | |
| Elongation | 200min | 650 | |
| Heat Loss | 3.0Max | 0.76 | |
| UV Resistance Test | 3.5Max | 2.74 | Delta E |
| Chemical Resistance | Unchanged | Unchanged | Wax,Silicone× 24h |
| Erodibility for Contaminated Film | No Fuzz | Unchanged | |
| Erodibility for Door Line applied Resin | No Contamination/ Swelling/ Softening/ Discoloration | Unchanged | |
| Weather Resistance Test | No Yellowing/ Stripping | Unchanged | |
| Oil Resistance Test | No Hardening/ Softening/ Fuzz/ Discoloration | Unchanged | |
| Hot/Cold Cycling Test | No Deterioration of Cross-section | Unchanged | |
| Antibacterial Test | 5 or more Clear Zones, No Mold-Growth on Specimen | Unchanged | |
| Lead Content | 100ppm or less | Nil | |
| Cadmium Content | 100ppm or less | Nil | |
| Dibutyltin Content | 100ppm or less | Nil | |
| Cresolacidester Content | 1000pm or less | Nil | |
| Heavy-Metal Content | 1 or less based on Lead | Nil | |
| Residue remaining after Evaporation | 30 or less | Nil | |

*Fig. 1*

Table 1 : (Test Method: LG(61)-E-8020)

| Test Item | Standard | Result | Note |
|---|---|---|---|
| Hardness | 67~77 | 71 | Shore A |
| Tensile Strength | 0.8Kg/cm² | 0.75~0.85 | |
| Elongation | 200min | 650 | |
| Heat Loss | 3.0Max | 0.76 | |
| UV Resistance Test | 3.5Max | 2.74 | Delta E |
| Chemical Resistance | Unchanged | Unchanged | Wax,Silicone× 24h |
| Erodibility for Contaminated Film | No Fuzz | Unchanged | |
| Erodibility for Door Line applied Resin | No Contamination/ Swelling/ Softening/ Discoloration | Unchanged | |
| Weather Resistance Test | No Yellowing/ Stripping | Unchanged | |
| Oil Resistance Test | No Hardening/ Softening/ Fuzz/ Discoloration | Unchanged | |
| Hot/Cold Cycling Test | No Deterioration of Cross-section | Unchanged | |
| Antibacterial Test | 5 or more Clear Zones, No Mold-Growth on Specimen | Unchanged | |
| Lead Content | 100ppm or less | Nil | |
| Cadmium Content | 100ppm or less | Nil | |
| Dibutyltin Content | 100ppm or less | Nil | |
| Cresolacidester Content | 1000pm or less | Nil | |
| Heavy-Metal Content | 1 or less based on Lead | Nil | |
| Residue remaining after Evaporation | 30 or less | Nil | |

Fig. 2

Table 2 : (Test Method: LG(61)-E-8020)

| Test Item | Standard | Result | Note |
|---|---|---|---|
| Hardness | 67~77 | 70 | Shore A |
| Tensile Strength | $0.8Kg/cm^2$ | 0.80~0.90 | |
| Elongation | 200min | 600 | |
| Heat Loss | 3.0Max | 0.80 | |
| UV Resistance Test | 3.5Max | 2.50 | Delta E |
| Chemical Resistance | Unchanged | Unchanged | Wax,Silicone× 24h |
| Erodibility for Contaminated Film | No Fuzz | Unchanged | |
| Erodibility for Door Line applied Resin | No Contamination/ Swelling/ Softening/ Discoloration | Unchanged | |
| Weather Resistance Test | No Yellowing/ Stripping | Unchanged | |
| Oil Resistance Test | No Hardening/ Softening/ Fuzz/ Discoloration | Unchanged | |
| Hot/Cold Cycling Test | No Deterioration of Cross-section | Unchanged | |
| Antibacterial Test | 5 or more Clear Zones, No Mold-Growth on Specimen | Unchanged | |
| Lead Content | 100ppm or less | Nil | |
| Cadmium Content | 100ppm or less | Nil | |
| Dibutyltin Content | 100ppm or less | Nil | |
| Cresolacidester Content | 1000pm or less | Nil | |
| Heavy-Metal Content | 1 or less based on Lead | Nil | |
| Residue remaining after Evaporation | 30 or less | Nil | |

Fig. 3

Table 3 : (Test Method: LG(61)-E-8020)

| Test Item | Standard | Result | Note |
|---|---|---|---|
| Hardness | 67~77 | 72 | Shore A |
| Tensile Strength | 0.8Kg/cm² | 0.60~0.70 | |
| Elongation | 200min | 500 | |
| Heat Loss | 3.0Max | 0.70 | |
| UV Resistance Test | 3.5Max | 2.50 | Delta E |
| Chemical Resistance | Unchanged | Unchanged | Wax,Silicone× 24h |
| Erodibility for Contaminated Film | No Fuzz | Unchanged | |
| Erodibility for Door Line applied Resin | No Contamination/ Swelling/ Softening/ Discoloration | Unchanged | |
| Weather Resistance Test | No Yellowing/ Stripping | Unchanged | |
| Oil Resistance Test | No Hardening/ Softening/ Fuzz/ Discoloration | Unchanged | |
| Hot/Cold Cycling Test | No Deterioration of Cross-section | Unchanged | |
| Antibacterial Test | 5 or more Clear Zones, No Mold-Growth on Specimen | Unchanged | |
| Lead Content | 100ppm or less | Nil | |
| Cadmium Content | 100ppm or less | Nil | |
| Dibutyltin Content | 100ppm or less | Nil | |
| Cresolacidester Content | 1000pm or less | Nil | |
| Heavy-Metal Content | 1 or less based on Lead | Nil | |
| Residue remaining after Evaporation | 30 or less | Nil | |

*Fig. 4*

Table 4 : (Test Method: LG(61)-E-8020)

| Test Item | Standard | Result | Note |
|---|---|---|---|
| Hardness | 67~77 | 67 | |
| Tensile Strength | 0.8Kg/cm$^2$ | 1.2 | |
| Elongation | 200min | 680 | |
| Heat Loss | 3.0Max | 0.6 | |
| UV Resistance Test | 3.5Max | 2.65 | Delta E |
| Chemical Resistance | Unchanged | Unchanged | |
| Erodibility for Contaminated Film | No Fuzz | Unchanged | |
| Erodibility for Door Line applied Resin | No Contamination/ Swelling/ Softening/ Discoloration | Unchanged | |
| Weather Resistance Test | No Yellowing/ Stripping | Unchanged | |
| Oil.Resistance Test | No Hardening/ Softening/ Fuzz/ Discoloration | Unchanged | |
| Hot/Cold Cycling Test | No Deterioration of Cross-section | Unchanged | |
| Antibacterial Test | 5 or more Clear Zones, No Mold-Growth on Specimen | Unchanged | |
| Lead Content | 100ppm or less | Nil | |
| Cadmium Content | 100ppm or less | Nil | |
| Dibutyltin Content | 100ppm or less | Nil | |
| Heavy-Metal Content | 1 or less based on Lead | Nil | |
| Residue remaining after Evaporation | 30 or less | Nil | |

PROFILE GASKET AND COMPOSITION THEREOF

BACKGROUND OF THE INVENTION

1. Field of the Invention

The present invention pertains to an easily locked, environmentally friendly profile gasket and a composition thereof.

2. Description of Related Art

Typically, a profile gasket for refrigerators or Kimchi refrigerators, which is made of soft polyvinyl chloride resin (PVC), is mounted to a door of the refrigerator to absorb impact upon closing the refrigerator door and to block leakage of cool air of the refrigerator. However, since such PVC gasket suffers from the drawback of emitting environmental hormones, it cannot be used for preservation of frozen foods in refrigerators. In addition, the PVC gasket emits halogen gas upon heat welding of a corner connection part, thus damaging the ozone layer and also negatively affecting safety of workers. Particularly, attributable to emission of dioxins upon incineration, treatment cost of waste refrigerators is increased.

Problems such as emission of environmental hormones or dioxins by the PVC gasket for refrigerators are disclosed in Japanese Patent Laid-open Publication Nos. 1999-83193 and 2000-191880. In the above patents, the gasket is made of a thermoplastic composition consisting mainly of olefin, but has a high heat welding temperature of 300-350° C. due to high melting points of the composition. Thus, the above patents are limited in their industrial applications due to many problems involving high temperature heat welding. Moreover, research into low temperature heat welding plastic materials and materials not emitting halogen gas has been ongoing in Korea, but no satisfactory results have been obtained.

SUMMARY OF THE INVENTION

A profile gasket of the present invention is applied as gaskets for contact sealing of refrigerators, Kimchi refrigerators and other food storage appliances, and as low temperature welding profile gaskets for contact sealing in automobiles or other industrial fields.

Therefore, it is an object of the present invention to provide a profile gasket having low temperature heat welding characteristics, and a composition thereof.

It is another object of the present invention to provide a profile gasket emitting less environmentally harmful materials due to its low temperature heat welding characteristics, and a composition of the profile gasket.

It is a still another object of the present invention to provide a profile gasket which can be welded at 140-180° C., much lower than heat welding temperatures of conventional olefin (TPE, thermoplastic elastomer) gaskets of 300-350° C., or PVC of 200° C.

It is a further object of the present invention to provide a profile gasket and a profile gasket composition, characterized by decreasing an extrusion temperature, thereby being easily extruded due to melting of the gasket composition at relatively low temperatures, having controllable extrusion properties, achieving easy surface control of molded products, thus precisely molding extrudates having complex structures such as profile gaskets, as well as realizing low temperature heat welding, thereby decreasing the amount of harmful gases generated upon high temperature welding, easy corner welding of the profile gasket, shortened heat welding time and reduced heat welding energy consumption.

BRIEF DESCRIPTION OF THE DRAWINGS

The above and other objects, features and other advantages of the present invention will be more clearly understood from the following detailed description taken in conjunction with the accompanying drawings, in which:

FIG. 1 is Table 1 showing performances of the Kimchi regrigerator gasket prepared by the composition of the Example 1 according to the present invention;

FIG. 2 is Table 2 showing performances of the Kimchi regrigerator gasket prepared by the composition of the Example 2 according to the present invention;

FIG. 3 is Table 3 showing performances of the Kimchi regrigerator gasket prepared by the composition of the Example 3 according to the present invention;

FIG. 4 is Table 4 showing performances of the Kimchi regrigerator gasket prepared by the composition of the Example 4 according to the present invention;

DETAILED DESCRIPTION OF THE INVENTION

Figure 5:
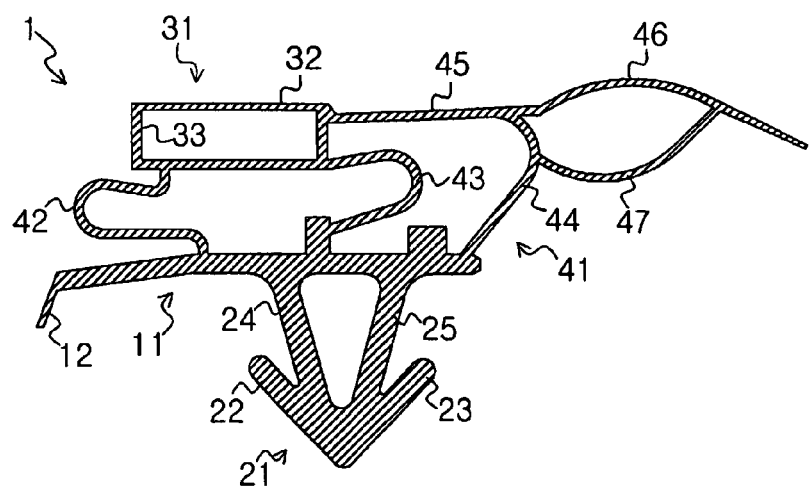
FIG. 5 is an enlarged cross-sectional view showing a structure of the gasket according to the present invention.
Figure 6:
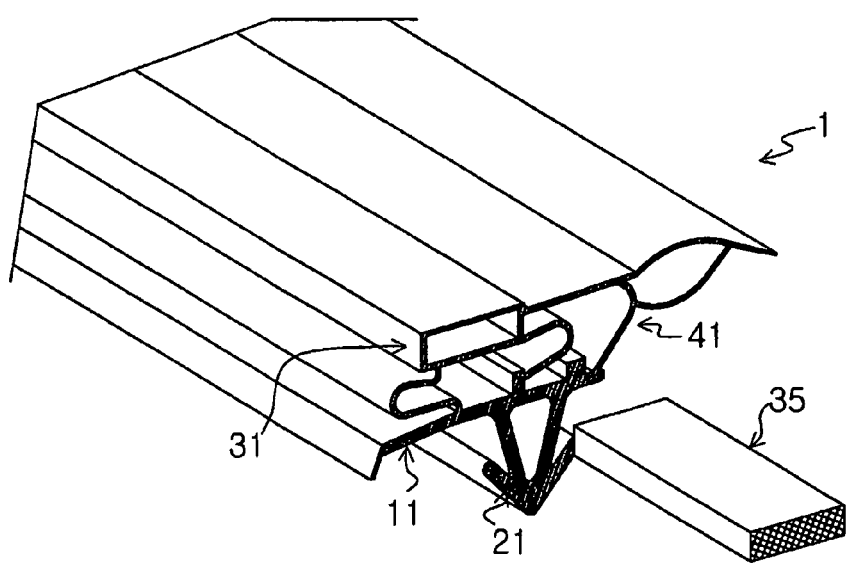
FIG. 6 is a perspective view of the gasket shown in FIG. 5.
Figure 7:
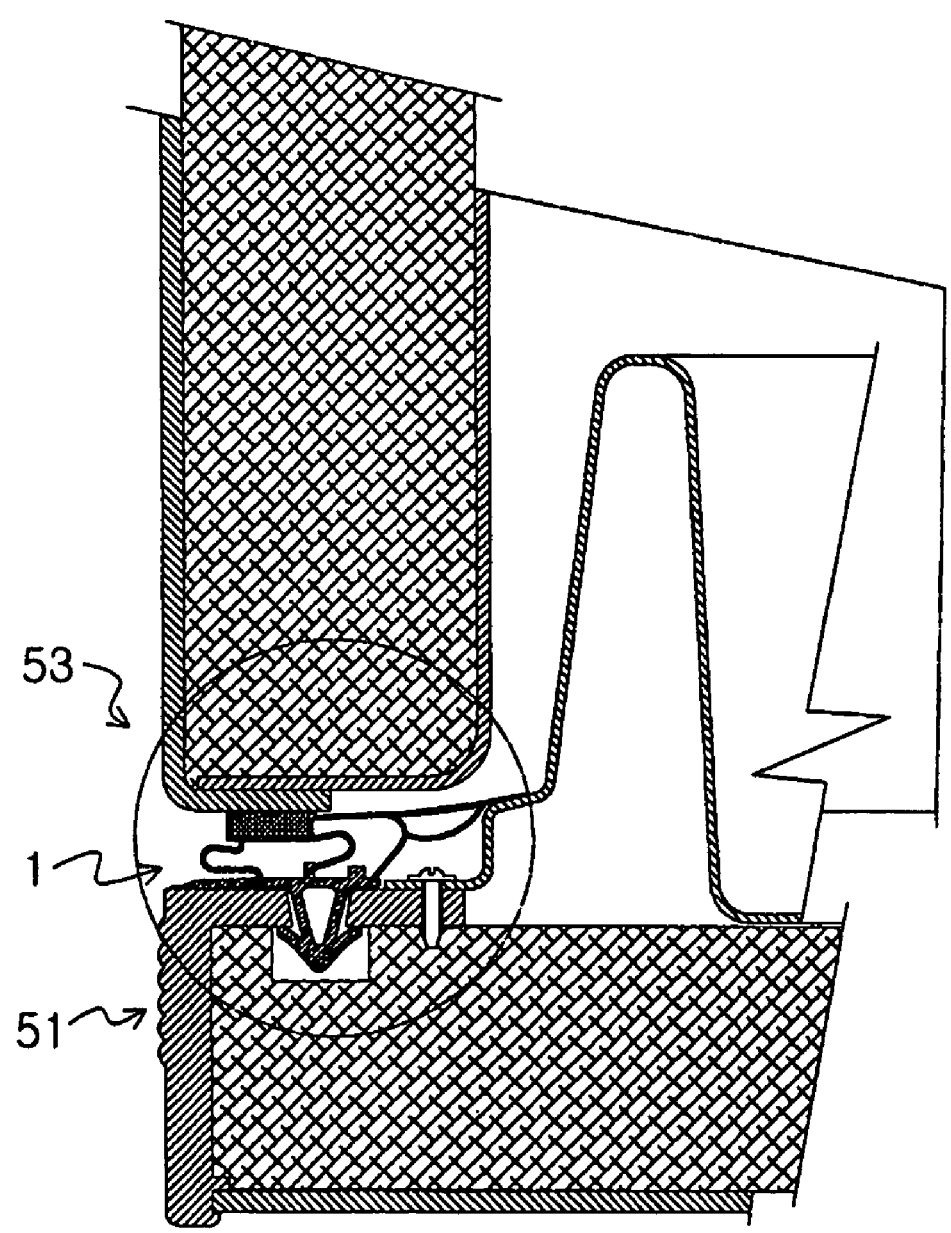
FIG. 7 is a top plan view of a practically applied gasket according to the present invention.
Figure 8:
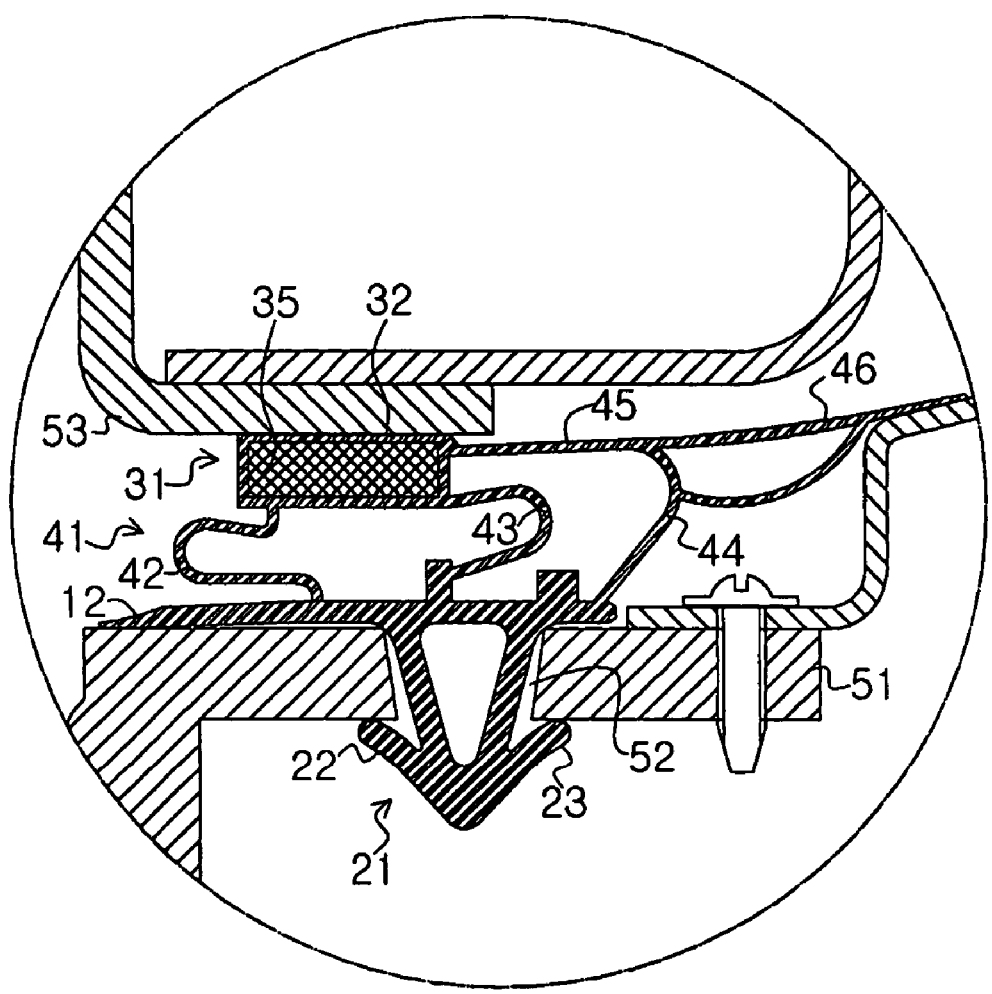
FIG. 8 is an enlarged view of the marked portion shown in FIG. 7.

Referring to FIGS. 5 to 8, there is shown a two-hardness profile gasket 1 comprising a locking part 21 with high hardness, a contact sealing part 31 with low hardness and an elastic support part 41. The profile gasket 1, which is manufactured by two extruders holding an extrusion head in common, includes the locking part 21 below a gasket base 11 for mounting the gasket 1 to a target body 51 such as a refrigerator door, the contact sealing part 31 for sealing a junction of the refrigerator door with an edge of a refrigerator cabinet 53, and the elastic support part 41 for elastically supporting the contact sealing part 31 to the gasket base 11.

In the profile gasket 1 of the present invention, the locking part 21 having high hardness incorporates barb wings 22 and 23 which are easily inserted into a fitting groove 52 of the target body 51 but exhibit release resistance so as not to be easily released from the groove 52, and truss supports 24 and 25 connecting the barb wings 22 and 23 with the base 11. The barb wings 22 and 23 having high hardness are arrow-shaped and are easily inserted into the fitting groove 52 of the target body 51. Thereby, the target body 51 is stably supported to the base 11 by steps of the groove 52. One side of the truss supports 24 and 25 is connected to the barb wings 22 and 23 formed along a ridge of the locking part 21 and functions to correctly position the barb wings 22 and 23 in the groove 52, while the other side of the truss supports 24 and 25 is connected to the base 11 opposite to the ridge of the locking part 21, thereby increasing supporting force of the base 11. Further, the above locking part 21 acts to lock the base 11 to the target body 51, in which the base 11 comprises, at one side thereof, a collar 12 which is contact-sealed onto a surface of the target body 51 for shielding a gap between the base 11 and the target body 51.

In addition, the contact sealing part 31 having low hardness is supported to the base 11 through the elastic support part 41. Thereby, a main contact surface 32 of the contact sealing part 31 is elastically contact-sealed to the edge of the refrigerator cabinet 53 such as a refrigerator body. Further, by attractive force of a magnet 35 inserted into an internal cavity 33, the main contact surface 32 is contact-sealed to the edge of the refrigerator cabinet 53 as a magnet-attaching body. Therefore, influx of external air or efflux of air in the refrigerator is blocked in the closed state of the refrigerator door.

The elastic support part 41 comprising a plurality of bulged flexible connectors 42, 43 and 44 functions to elastically support the contact sealing part 31 to the base 11 and to absorb impact upon closing the door. One side of the bulged flexible connector 44 is equipped with a sub-contact surface 45 and an extension wing 46, and is closely contacted to an interior structure of the target body 51, thus shielding an assembling space of the interior structure. The above extension wing 46 is further mounted with an elastic support 47 to increase close contact force of the extension wing 46 with the refrigerator cabinet.

Meanwhile, a composition of the profile gasket 1 of the present invention is composed of a thermoplastic resin comprising a base resin in mixture with 20-60 parts by weight of a filler, 10-30 parts by weight of a plasticizer and 0.5-7 parts by weight of other additives, melted at 140-250° C. and molded, in which the base resin is comprised of 8-15 parts by weight of a dynamically crosslinked mixture or blended elastomer (Semi-IPN (Semi-Inter Penetrating Network, Honam Ethylene Co. Ltd., Korea)) of a synthetic rubber (EPDM, EPM) and polypropylene, 10-20 parts by weight of an olefin elastomer (Ex-0201, Exxon Corporation, Japan) made of a metallocene catalyst, 2.13-10.3 parts by weight of polymethylmethacrylate (PMMA), 0.6-6 parts by weight of a hydrogen-added resin (HSBC (hydrogenated styrene block copolymer): di-block, tri-block), and 2-10 parts by weight of a mixture of thermoplastic urethane (TPU) and a hydrogen-added resin as an adhesive resin.

Of the base resin composition, the hydrogen-added resin may function as a homogenizing agent, however a separate homogenizing agent is additionally added. Also, the base resin may further comprise any one selected from the group consisting of 2-5 parts by weight of ethyleneacrylate ethyl copolymer, 2-4 parts by weight of polypropylene homopolymer, 2-3 parts by weight of polyisoprene, and mixtures thereof. The dynamically cross-linked Semi-IPN is preferable but in some cases generally blended modified polypropylene may be used.

The elastomer made of the Semi-IPN acts to increase strength of the molded product and compatibility with the olefin polymer, and provides a shape-maintaining function upon extrusion. When the Semi-IPN is used in an amount exceeding 8-15 parts by weight based on the whole resin composition, heat welding strength is remarkably decreased, and high temperature heat welded interface may be exfoliated, thus having difficulty in its practical use and decreasing flowability. The ethyleneacrylateethyl copolymer (EEA) functions as a hardness controlling agent. Specifically, when the two-hardness gasket is prepared by two extruders holding an extrusion head in common, a high hardness part has a large content of EEA, while a low hardness part has a small content of EEA.

In addition, the metallocene-based olefin elastomer of the resin composition controls elasticity and viscosity of the resin and provides a rubbery feel to the resin, thus contributing to flexibility and good external appearance of resin products. In particular, the metallocene-based olefin elastomer is responsible for maintaining viscoelasticity at low temperatures and thus provides low temperature properties essential for the gasket of low temperature products, such as refrigerators. The polymethylmethacrylate acts to increase extrusion flowability and low temperature heat welding property as its most important function, thereby decreasing melting points and heat welding temperatures of the resin.

The hydrogen-added copolymer resin is a di-block or tri-block polymer comprising styrene as a hard segment, and as a soft segment, butadiene and/or isoprene, and provides oil resistance and heat resistance to the resin. Additionally, the hydrogen-added resin serves as a compatibilizing agent with the resin such as ethyleneacrylate ethyl copolymer (EEA), polymethylmethacrylate and olefin. The mixture of the hydrogen-added resin and the thermoplastic urethane greatly increases heat welding strength, and acts as a tackifier or an adhesive and as an important co-agent.

Further, the filler functions to balance extrusion properties of the resin composition by maintaining strength at a suitable level and by increasing wetness of the composition, and the plasticizer is responsible for controlling hardness and viscosity of the resin composition as well as extrusion properties upon extrusion. As necessary, light stabilizers, antiozonants, antioxidants, colorants and lubricants may be additionally used as other additives.

As devices used for the preparation of the inventive composition, there are proposed mixers or mills for general preparation of a resin composition or a rubber composition. Preferably, the resin mixture is previously kneaded by use of a closed mill such as a banbury mixer and then further kneaded using a single screw mill or a twin screw mill. It is preferred that a twin screw mill is used. Upon preparation of the profile gasket of the present invention, the above mentioned materials are introduced into an extruder and melted, and extruded to a desired shape with the use of a conventional PVC profile gasket preparation device, to prepare a profile gasket.

In the profile gasket of the present invention and the composition thereof prepared by use of conventional preparation devices, an extruding process is readily performed at an extrusion temperature of 140-250° C. which is considerably lower than preparation temperatures of conventional profile gaskets. Further, balance of extrusion properties as well as surface properties of molded products are easily controlled due to low extrusion temperatures, thereby precisely forming the molded products of high quality having a complicated structure such as refrigerator profile gaskets. In addition, upon locking the extruded profile gasket, a heat welding process is carried out at a relatively low temperature of 140-180° C., whereby problems due to high temperature welding performed at 200° C. or higher do not occur. Also, there are other advantages in terms of easily performing a corner welding process of the refrigerator gasket, shortening a period of time required for heat welding, and reducing energy need for heat welding. Moreover, environmentally harmful materials are not generated from the gasket locked to the refrigerator.

Having generally described this invention, a further understanding can be obtained by reference to certain specific examples which are provided herein for purposes of illustration only and are not intended to be limiting unless otherwise specified.

EXAMPLE 1

Preparation of Profile Gasket for Refrigerator

Into an extruder, a base resin comprising, based on parts by weight, 11.2 parts of TPV 55 (Honam Ethylene Co. Ltd., Korea), 15.2 parts of an olefin elastomer made of metallocene catalyst (Ex-0201, Exxon Corporation, Japan), 8.45 parts of polymethylmethacrylate (emulsion polymerization PMMA), 3.25 parts of ethyleneacrylate ethyl copolymer, 3.7 parts of a hydrogen-added thermoplastic resin (S-4055, Kuraray Co. Ltd., Japan) as a homogenizing agent and 3.25 parts of TU polymer 5865 (mixture of HSBC and TPU, Kuraray Co. Ltd., Japan) as an adhesive resin, was added with 19.0 parts by weight of $CaCO_3$ as a filler, 18.2 parts by weight of $CaSiO_2$ (Wallastonate), 13.9 parts by weight of paraffin process oil (350F, Idemitsu Co. Ltd., Japan) as a plasticizer, 2.05 parts by weight of $TiO_2$, and as other additives 0.78 parts by weight of a homogenizing agent, 0.52 parts by weight of a light stabilizer (benzophenones, seesorb101) and 0.5 parts by weight of stearic amide. The reaction mixture was melted at a barrel temperature of 160° C. and extruded to form a profile gasket for a refrigerator. From the Table 1 of FIG. 1, it can be seen that the gasket manufactured by the composition of the present example is suitable for use as a refrigerator gasket in terms of hardness, tensile strength, elongation, heat loss, UV resistance test, chemical resistance, erodibility for contaminated film and for resin applied to door line, weather resistance, oil resistance, cooling cycling test, antibacterial test, lead content, cadmium content, dibutyltin content, cresol acid ester content and residue remaining after evaporation.

EXAMPLE 2

Preparation of Profile Gasket for Refrigerator

Into an extruder, a base resin comprising, based on parts by weight, 12.00 parts of TPV 55 (Honam Ethylene Co. Ltd., Korea), 16.7 parts of an olefin elastomer made of metallocene catalyst (Ex-0201, Exxon Corporation, Japan), 9.00 parts of polymethylmethacrylate (emulsion polymerization PMMA), 3.45 parts of ethyleneacrylateethyl copolymer, 3.90 parts of a hydrogen-added thermoplastic resin (S-4055, Kuraray Co. Ltd., Japan) as a homogenizing agent and 7.97 parts of TU polymer (mixture of HSBC and TPU, Kuraray Co. Ltd., Japan) as an adhesive resin, was added with 14.6 parts by weight of $CaCO_3$ as a filler, 14.0 parts by weight of $CaSiO_2$ (Wallastonate), 14.7 parts by weight of paraffin process oil 350F as a plasticizer, 2.30 parts by weight of $TiO_2$, and as other additives 0.78 parts by weight of a homogenizing agent (EVA-g-PMMA, NOF Japan) and 0.60 parts by weight of a light stabilizer. The reaction mixture was melted at a barrel temperature of 165° C. and extruded to form a profile gasket for a refrigerator. From the Table 2 of FIG. 2, it can be seen that the gasket manufactured by the composition of the present example is suitable for use as a refrigerator gasket in terms of hardness, tensile strength, elongation, heat loss, UV resistance test, chemical resistance, erodibility for contaminated film and for resin applied to door line, weather resistance, oil resistance, cooling cycling test, antibacterial test, lead content, cadmium content, dibutyltin content, cresol acid ester content and residue remaining after evaporation.

EXAMPLE 3

Preparation of Profile Gasket for Refrigerator

Into an extruder, a base resin comprising, based on parts by weight, 11.00 parts of TPV 55 (Honam Ethylene Co. Ltd., Korea), 15.4 parts of an olefin elastomer made of metallocene catalyst (Ex-0201, Exxon Corporation Japan), 10.3 parts of polymethylmethacrylate (emulsion polymerization PMMA), 3.20 parts of polymethylmethacrylate (Core-cell Acryl resin (Parapet GR), Kuraray Co. Ltd., Japan) and 6.80 parts of a hydrogen-added thermoplastic resin (S-4055, Kuraray Co. Ltd., Japan) as a homogenizing agent, was added with 18.28 parts by weight of $CaCO_3$ as a filler, 17.8 parts by weight of $CaSiO_2$ (Wallastonate), 13.6 parts by weight of 350F (paraffin process oil, Idemitsu Co. Ltd., Japan) as a plasticizer, 2.30 parts by weight of $TiO_2$, and as other additives 0.78 parts by weight of a homogenizing agent (EVA-g-PMMA) and 0.60 parts by weight of a light stabilizer. Then the reaction mixture was melted at a barrel temperature of 165° C. and extruded to form a profile gasket for a refrigerator. From the Table 3 of FIG. 3, it can be seen that the gasket manufactured by the composition of the present example is suitable for use as a refrigerator gasket in terms of hardness, tensile strength, elongation, heat loss, UV resistance test, chemical resistance, erodibility for contaminated film and for resin applied to door line, weather resistance, oil resistance, cooling cycling test, antibacterial test, lead content, cadmium content, dibutyltin content, cresol acid ester content and residue remaining after evaporation.

EXAMPLE 4

Preparation of Profile Gasket for Refrigerator

Into an extruder, a base resin comprising, based on parts by weight, 5.00 parts of TPV-55 (Honam Ethylene Co. Ltd., Korea), 19.54 parts of Ex-0201 (Exxon Corporation Japan) as an olefin elastomer made of metallocene catalyst, 2.13 parts of polypropylene homopolymer, 2.13 parts of polyisoprene, 5.50 parts of a hydrogen-added thermoplastic resin S-4055 (Kuraray Co. Ltd., Japan), 2.13 parts of TU polymer (mixture of HSBC and TPU, Kuraray Co. Ltd., Japan), 2.13 parts of butylbenzolphthalate (BBP) and 2.13 parts of polymethylmethacrylate (emulsion polymerization PMMA, Degusa Japan), was added with 34.08 parts by weight of calcium carbonate ($CaCO_3$, Samkwang Industrial Co. Ltd., Korea), 15.80 parts by weight of paraffin oil, 0.60 parts by weight of a homongenizing agent (EVA-g-PMMA), 2.13 parts by weight of $TiO_2$, 0.40 parts by weight of a light stabilizer (benzophenones, seesorb 101) and 0.30 parts by weight of polyethylene wax as a surface friction-reducing agent. The reaction mixture was melted at a barrel temperature of 170° C. and extruded to form a profile gasket for a Kimchi refrigerator. From the Table 4 of FIG. 4, it can be seen that the gasket manufactured by the composition of the present example is suitable for use as a refrigerator gasket in terms of hardness, tensile strength, elongation, heat loss, UV resistance test, chemical resistance, erodibility for contaminated film and for resin applied to door line, weather resistance, oil resistance, cooling cycling test, antibacterial test, lead content, cadmium content, dibutyltin content, and residue remaining after evaporation.

Each gasket composition prepared in the above examples 1 through 4 has a melting point of 180° C. or lower and is improved in heat welding properties. Thus, problems caused by conventional PVC profile gaskets may be prevented. The inventive composition exhibits good extrusion and injection properties, and devices used for preparation of conventional PVC profiles may be used as is. In the product molded from the inventive composition, low temperature welding is realized, thereby easily performing a welding process and realizing easy preparation of the product. Further, safety of the working environment is improved upon gasket welding.

INDUSTRIAL APPLICABILITY

According to the present invention, there are provided a profile gasket for contact sealing of refrigerators, Kimchi refrigerators and other food storage appliances, and a low temperature welding profile gasket for contact sealing in automobiles or other industrial fields as well as a composition used for the preparation of such gaskets. The inventive composition has low temperature heat welding properties capable of being welded at 140-180° C., thereby reducing emission of environmentally harmful materials, being easily extruded due to melting of the gasket composition at relatively low temperatures, having controllable extrusion properties, achieving easy surface control of molded products, thus precisely molding extrudates having complex structures such as profile gaskets. As well, low temperature welding is realized, and thus there are advantages in terms of decreasing the amount of harmful gases generated upon conducting high temperature welding, easy corner welding of the profile gasket, shortened welding time and reduced welding energy consumption.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A profile gasket composition comprising a base resin comprising 8-15 parts by weight of a dynamically crosslinked mixture or blended elastomer of a synthetic rubber and polypropylene; 10-20 parts by weight of a metallocene-based olefin elastomer; 2.13-10.3 parts by weight of polymethylmethacrylate; 0.6-6 parts by weight of a hydrogen-added thermoplastic resin; and 2-10 parts by weight of a mixture of thermoplastic urethane and a hydrogen-added resin as an adhesive resin.

2. The composition as defined in claim 1, wherein the base resin further comprises any one resin selected from among 2-5 parts by weight of ethyleneacrylate ethyl copolymer, 2-4 parts by weight of polypropylene homopolymer, 2-3 parts by weight of polyisoprene, and mixtures thereof.

3. The composition as defined in claim 1, wherein the base resin is added with 20-60 parts by weight of a filler, 10-30 parts by weight of a plasticizer and 0.5-7 parts by weight of other additives.

4. The composition as defined in claim 3, wherein the additives comprise stearic amide and polyethylene wax as a surface friction-reducing agent.

5. A profile gasket comprising a high hardness part and a low hardness part, manufactured from the composition comprising a base resin including 8-15 parts by weight of a dynamically crosslinked mixture or blended elastomer of a synthetic rubber and polypropylene; 10-20 parts by weight of a metallocene-based olefin elastomer; 2.13-10.3 parts by weight of polymethylmethacrylate; 0.6-6 parts by weight of a hydrogen-added thermoplastic resin; and 2-10 parts by weight of a mixture of thermoplastic urethane and a hydrogen-added resin as an adhesive resin.

6. The profile gasket as defined in claim 5, further comprising:
 a locking part below a gasket base for mounting the gasket to a refrigerator door as a target body;
 a contact sealing part for sealing a junction of the refrigerator door with an edge of a refrigerator cabinet; and
 an elastic support part for elastically supporting the contact sealing part to the gasket base;
 wherein the locking part includes barb wings which are easily inserted into a fining groove of the target body but generate release resistance so as not to be easily released from the groove and truss supports connecting the barb wings with the gasket base, and functions to lock the gasket base including a collar at one side thereof to the target body, and
 the elastic support part includes a plurality of bulged flexible connectors, functioning to elastically support the contact sealing part to the gasket base, in which one side of the bulged flexible connector is equipped with a sub-contact surface and an extension wing, and the extension wing is provided with an elastic support.

7. The profile gasket as defined in claim 5, wherein the base resin further comprises any one resin selected from among 2-5 parts by weight of ethyleneacrylate ethyl copolymer, 2-4 parts by weight of polypropylene homopolymer, 2-3 parts by weight of polyisoprene, and mixtures thereof.

8. The profile gasket as defined in claim 5, wherein the base resin is added with 20-60 parts by weight of a filler, 10-30 parts by weight of a plasticizer and 0.5-7 parts by weight of other additives.

9. The profile gasket as defined in claim 8, wherein the additives comprise stearic amide and polyethylene wax as a surface friction-reducing agent.

* * * * *

UNITED STATES PATENT AND TRADEMARK OFFICE
CERTIFICATE OF CORRECTION

PATENT NO. : 7,687,131 B2  Page 1 of 1
APPLICATION NO. : 10/530842
DATED : March 30, 2010
INVENTOR(S) : Jun It is certified that error appears in the above-identified patent and that said Letters Patent is hereby corrected as shown below:

Column 8, Line 20, Claim 6, "fining groove" should read -- fitting groove --

Signed and Sealed this

Tenth Day of August, 2010

David J. Kappos
*Director of the United States Patent and Trademark Office*